July 10, 1934.    R. B. CLAGHORN    1,966,027
REVERSIBLE SULKY PLOW
Filed Feb. 28, 1933    5 Sheets-Sheet 3
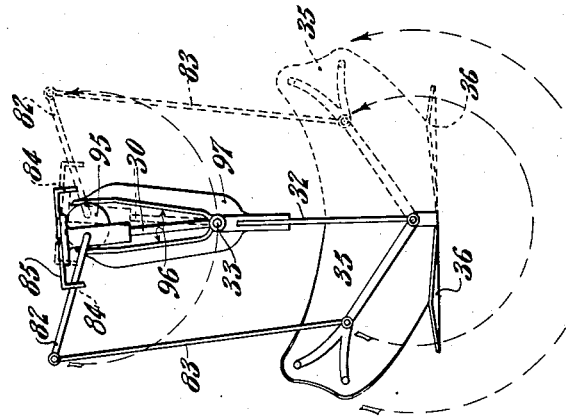
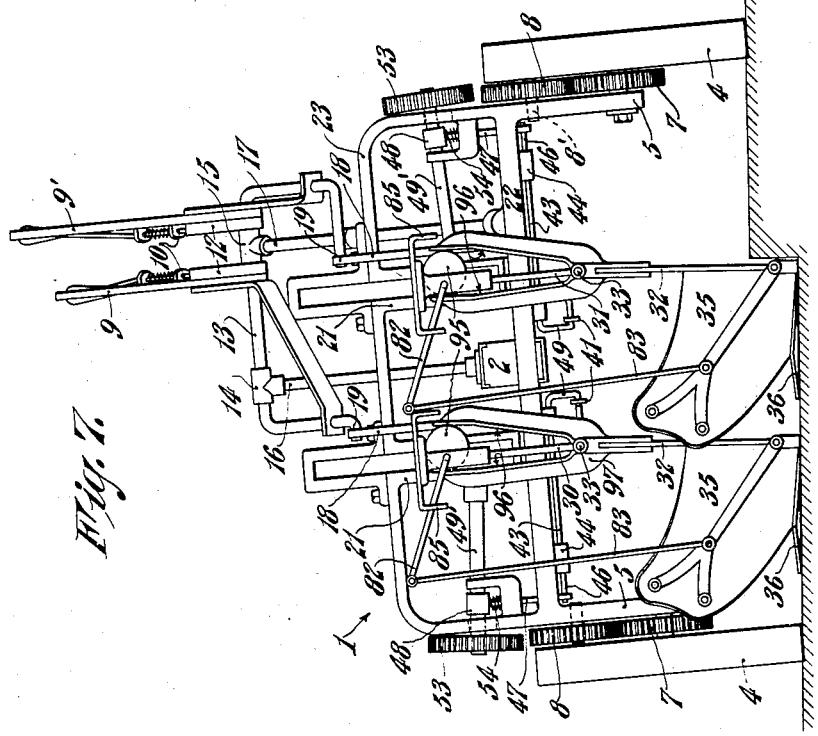
INVENTOR,
Robert B. Claghorn,
BY
Harry W. Bowen
ATTORNEY.

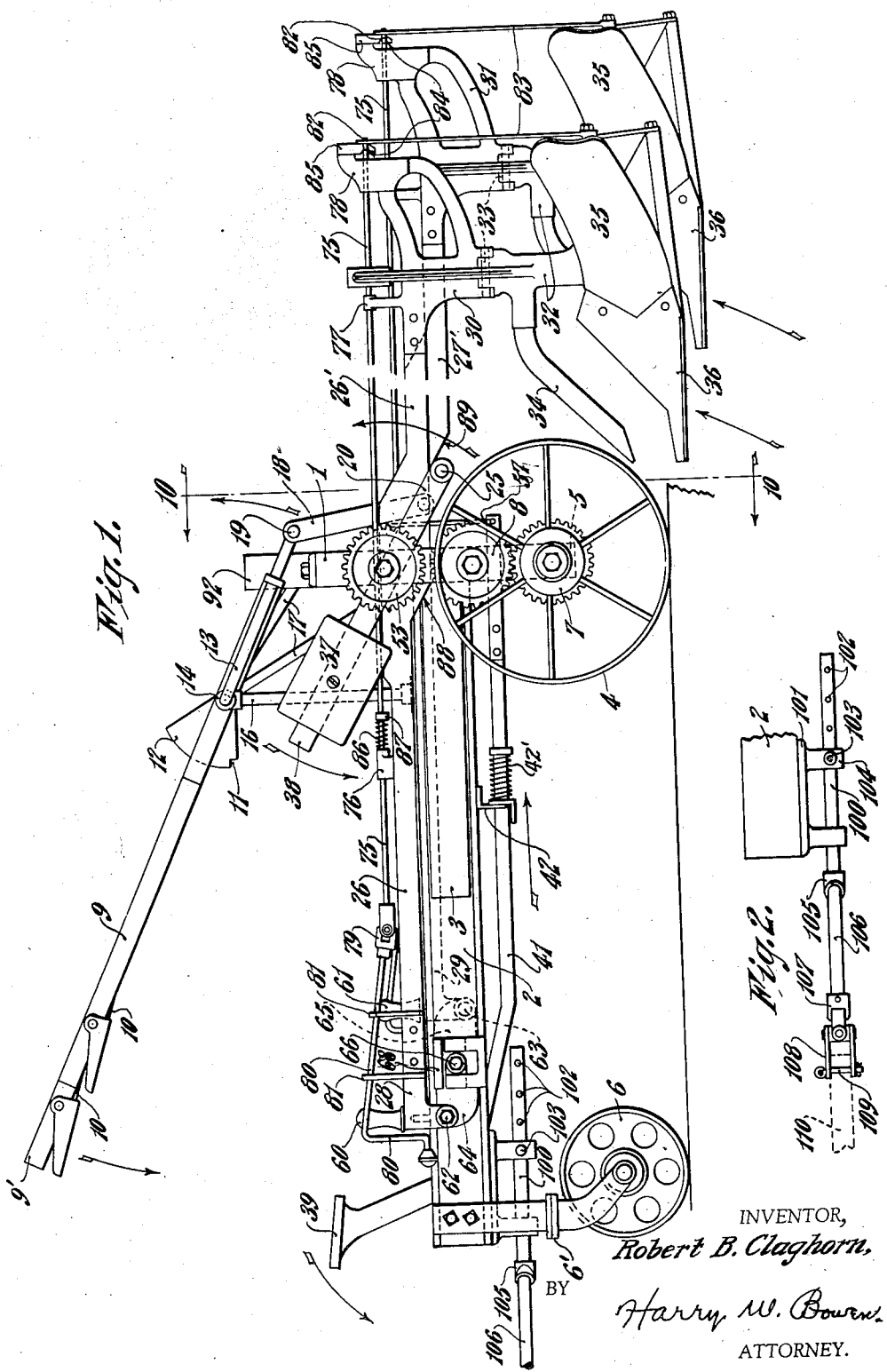

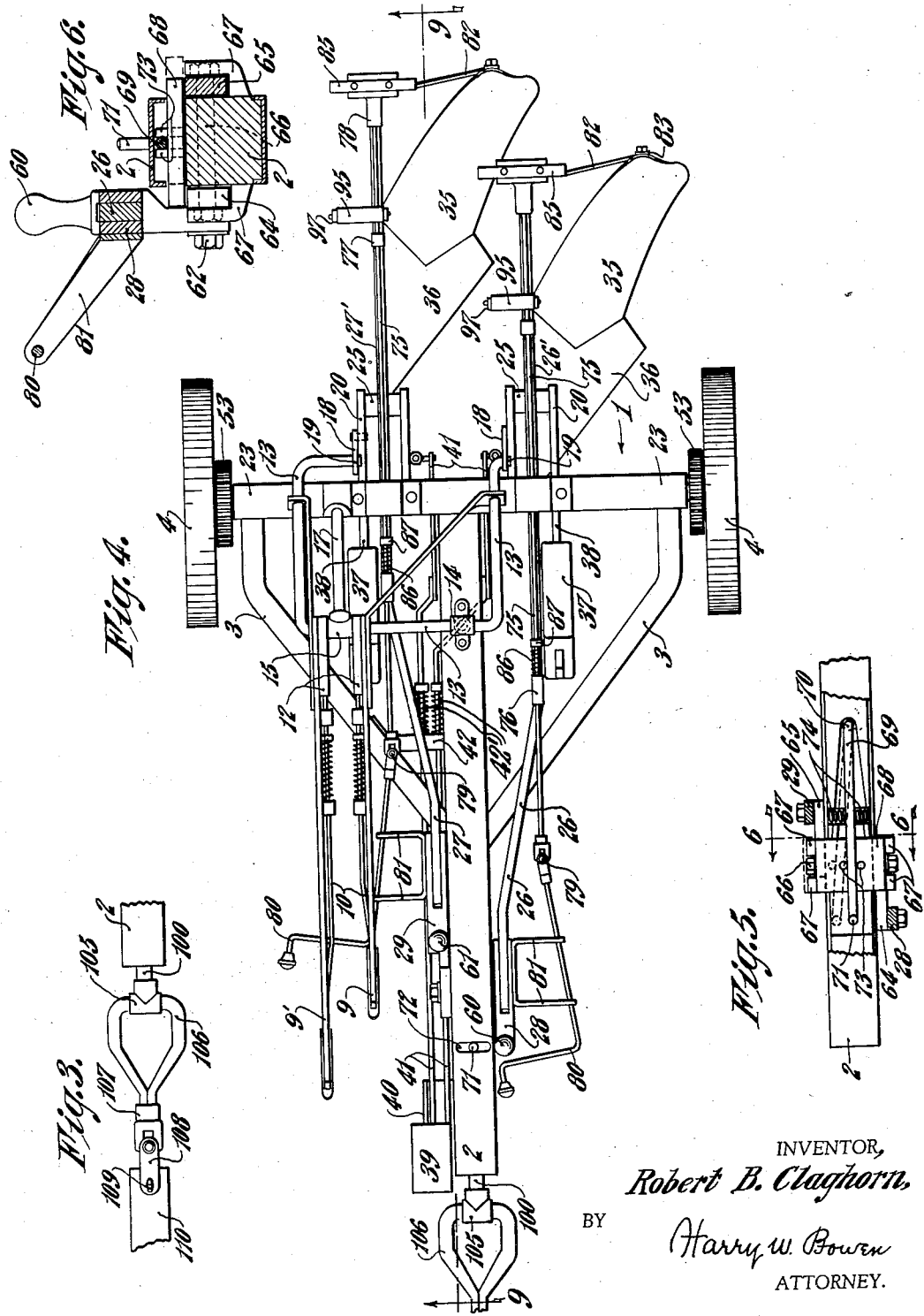

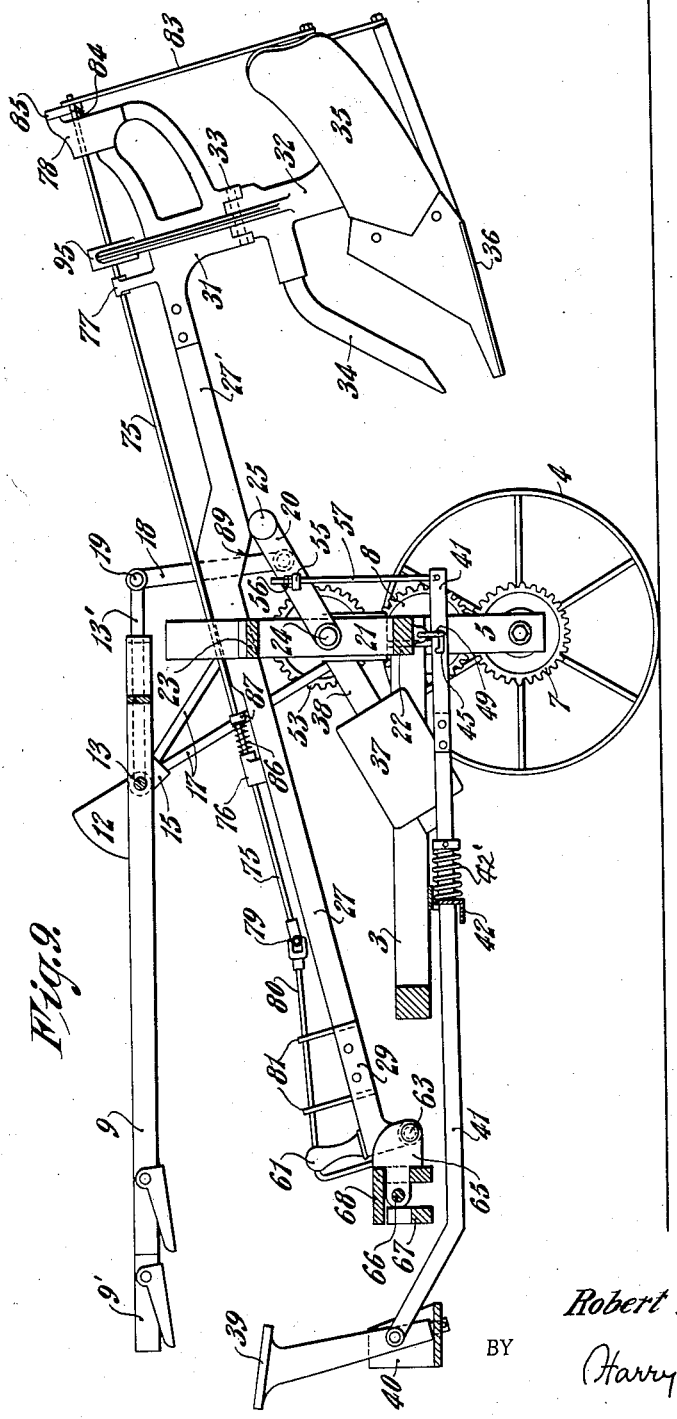

July 10, 1934.   R. B. CLAGHORN   1,966,027
REVERSIBLE SULKY PLOW
Filed Feb. 28, 1933   5 Sheets-Sheet 5
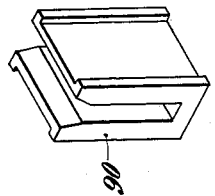
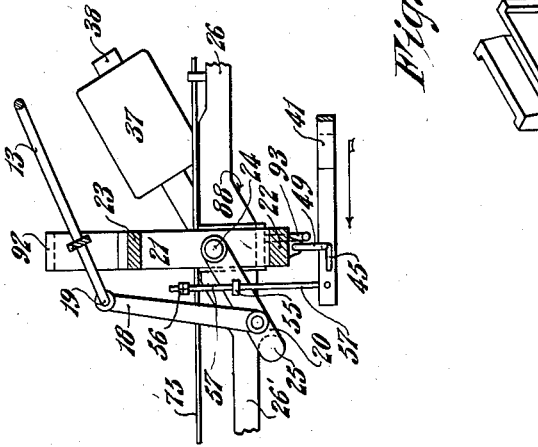
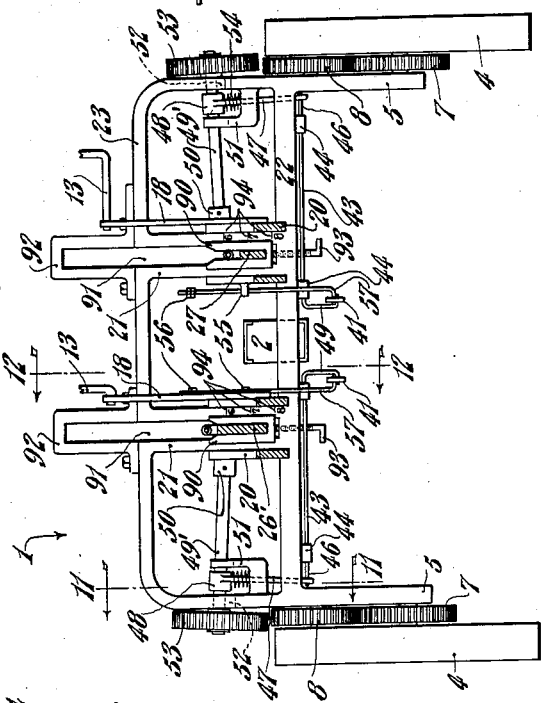
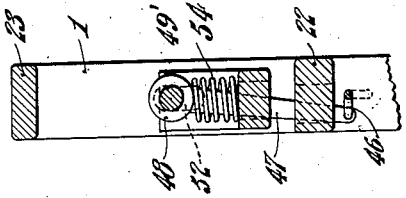
INVENTOR,
Robert B. Claghorn,
BY Harry W. Bowen
ATTORNEY.

Patented July 10, 1934

1,966,027

UNITED STATES PATENT OFFICE 1,966,027

REVERSIBLE SULKY PLOW

Robert B. Claghorn, Greenfield, Mass.

Application February 28, 1933, Serial No. 658,887

17 Claims. (Cl. 97—72)

My invention relates to improvements in reversible sulky plows.

An object of my invention is to provide a sulky plow which may be used to plow two furrows at once, and which may be reversed so that, while moving across a section of ground to be plowed alternately in one direction and then in the opposite direction but always adjacent the furrows already turned, the furrows will always be turned by the plows in the same direction. In other words, the furrows will be turned alternately to the right and to the left, as the direction of movement of the plow is reversed.

Broadly, my invention comprises a frame member supported on wheels, means for connecting the frame member to a tractor or other drawing or draft means, a pair of drawbars secured on said frame, a plow hingedly secured on each of said drawbars, means for raising and lowering the plows, means for reversing the forward and backward positions of the plows relative to each other, means for turning over the shares and moldboards, thereby reversing their positions relative to their supporting frogs, means for locking the drawbars in their operative positions, means for automatically adjusting the plow frogs when the plows are reversed to maintain them in a vertical plane and compensate for the alternate, axial, tipping of the frame from one side to the other, due to the tracking of alternate, or opposite, wheels in a plowed furrow, and means for adjusting the height of the plows in operative position for various depths of the furrow to be plowed.

The operation and construction of these features, and other objects and advantages of my invention, will be fully brought forth, illustrated, and explained in the specification, the accompanying drawings, and the appended claims.

A preferred embodiment of my invention is illustrated in the accompanying drawings, in which:

Fig. 1 is a side elevational view of the plow, showing it in operative position.

Fig. 2 is a side elevational view of the means for connecting the plow to a tractor, or the like.

Fig. 3 is a plan view of the device shown in Fig. 2.

Fig. 4 is a plan view of the plow construction, as a whole.

Fig. 5 is a detail plan view of the locking means for the drawbars, with a portion of the frame tongue broken away.

Fig. 6 is a vertical sectional view on the line 6—6 of Fig. 5.

Fig. 7 is a rear elevational view of the plow construction in operative position.

Fig. 8 is a diagrammatic rear elevational view of one of the plows in raised position, illustrating the means for reversing the position of the plow frog, relative to the supporting frame to compensate for the tipping, or inclined position of the frame.

Fig. 9 is a longitudinal sectional view approximately on the line 9—9 of Fig. 4, except that the plow and its related members are shown in raised position.

Fig. 10 is a cross sectional view on the line 10—10 of Fig. 1.

Fig. 11 is a detail sectional view on the line 11—11 of Fig. 10.

Fig. 12 is a detail sectional view on the line 12—12 of Fig. 10, and

Fig. 13 is a perspective view of one of the drawbar bearings.

Referring now to the drawings in detail, in which like numerals refer to like parts throughout:—

When the machine has been drawn to the end of a furrow, the operations required to adapt the machine for plowing in the opposite direction are executed in the following sequence; first, raise the plows out of the furrow and high enough above ground to permit the reversing of the moldboards, this raising movement being accomplished either by hand levers, or by mechanism actuated by the wheels; second, reversing the relative, longitudinal positions of the two plows; that is changing them so that the plow, which was originally in advance, will be in the rear, and vice versa; third, reversing, or turning under the moldboards, so that they face in the opposite direction; and fourth, lowering the plows from their raised position to operative, or plowing position. The description of the machine will follow this sequence of operations, as nearly as is practicable.

The various mechanisms of the machine are supported on a main frame comprising a cross frame 1, forwardly extending tongue member 2, and diagonal braces 3. Rear wheels 4, secured to downwardly extending legs 5 of the cross frame 1, and a front wheel 6, secured to the front end of the tongue member 2, serve to support the main frame. Gears 7, revolvably secured to the legs 5 between the wheels 4 and legs 5 and keyed to the wheels 4, mesh with idler gears 8, which are also revolvably secured to the legs 5, as indicated at 8'. These gears serve to operate the mechanism for raising the plows by traction of the wheels 4. Hand levers 9 and 9', having the usual latches 10, hold the plows in raised position, when the latches 10 are engaged in the notches 11 of the quadrants 12. (See Fig. 1.) The levers 9 and 9' are secured to two coaxially mounted, independent crank arms 13 and 13' respectively, which are pivotally supported in bearings 14 and 15. The bearing 14 is supported on the tongue member 2 by a post 16, and the bearing 15 is supported on the cross frame 1 by struts 17. The quadrants 12 are fixedly secured to the bearing 15. Links 18, which are pivotally secured at their upper ends to ends 19 and 19' of the crank arms 13 and 13', are pivotally secured at their lower ends to U-shaped lifting members 20, which are in turn pivotally secured at 24 to columns 21, formed between a lower crossbar 22 and an upper crossbar 23 of the cross frame 1. Cross members 25, formed on the lifting members 20, pass underneath drawbars 26 and 27 and serve to raise these bars, 26 and 27, when pressure is exerted in a downwardly direction on the levers 9 and 9'. The drawbars 26 and 27 are fixedly secured at their forward ends to clevices 28 and 29, and fixedly secured at their rearward ends to plow frames 30 and 31, to which frogs 32 are hingedly secured at 33. Colters 34 are fixedly secured to the frogs 32, and moldboards 35 and shares 36 are pivotally secured to the frogs 32, in the usual manner employed in reversible sulky plows. Counterweights 37, adjustably secured on forwardly extending arms 38, formed on the lifting members 20, serve to counterbalance a large part of the weight of the plows, thus reducing materially the force required to lift the plows.

The plows may be raised by means of the mechanism described above, or by means of a foot pedal 39 and its associated mechanism, through the traction action of the wheels 4, which is illustrated most clearly in Figs. 9, 10, 11, and 12. The foot pedal 39 is pivotally secured in a bracket 40, which is secured to the tongue member 2, and has pivotally secured thereto bars 41. The bars 41 are slidably secured in a bearing member 42, which is secured to the tongue member 2 and one of the diagonal braces 3. Rods 43, revolvably secured in bearings 44 on the cross member 22 of the frame 1, engage at their inner ends 49 in bayonet slots 45, formed in the bars 41, and are formed at their outer ends with crank arms 46 which are connected to the lower ends of vertical arms 47 formed as a part of bearing members 48. Shafts 49', fixedly secured in bosses 50 formed on the lifting members 20, are also revolvably supported in the bearings 48 and guided in forks 51, formed as a part of the frame 23 and vertical slots 52 formed in the member 23. Gears 53, fixedly secured on shafts 49' at their outer ends, mesh with the gears 8, when the crank arms 46 are actuated by the pedal 39 and the bars 41, to pull the bearings 48 downwardly. Thus, when the foot pedal 39 is pressed downwardly and forwardly, the gears 53 are meshed with the gears 8, and as the wheels 4 revolve, the lifting members 20 are raised, and they, in turn, raise the draw bars 26 and 27. Springs 54 act to normally lift and hold the gears 53 out of engagement with the gears 8, and to disengage these gears when the draw bars 26 and 27 have been raised to the proper height. When the lifting members 20 have been raised far enough to permit the latches 10 on the hand levers 9 and 9' to engage in the notches 11 in the quadrants 12, lugs 55, formed on the lifting members 20, engage stops 56 on trip rods 57, raising the bars 41 and releasing the ends 49 of the rods 43 from the locking portion of the bayonet slots 45. The expansion springs 54 then disengage the gears 53 and 8. The plows are lowered into operative position by releasing the latches 10 from engagement in the notches 12; the plows will then drop because of their own weight.

When the plows have been raised and locked in raised position by the latches 10, their relative position may be reversed by the operator; that is, the forward plow may be moved by the operator to the rear position and the rearward plow to the forward position. The draw bars 26 and 27 are secured at their forward ends in the clevises 28 and 29. The clevises 28 and 29 are formed with handles 60 and 61 and pivotally secured at 62 and 63 to pivoted, or swivel, arms or links 64 and 65, which are in turn pivotally secured to a stud 66 in the tongue member 2. The links 64 and 65 normally have their bearing in lugs 67, (see Fig. 6), and are locked in this position by a locking bar, or block 68, which is slidably secured in the tongue member 2, (see Figs. 1, 5, 6, and 9). The draw bars 26 and 27 are moved by sliding the lock bar 68 to one side out of engagement with the swivel arms, then by grasping the handles on the clevises, the swivel arms may be revolved upwardly and through an approximate semi-circle. Thus, to reverse the position of the plows, indicated in the drawings, the arm 64 is revolved rearwardly and the arm 65 forwardly, and opposite movements of these arms will return the plows to the positions indicated in the drawings. The pivot points 62 are offset from the pin 66, so that both draw bars lie in horizontal planes when in operative position. The construction of the lock bar 68 and its cooperating parts is clearly illustrated in Figs. 5 and 6. A rod 69, which is pivotally secured in the tongue member 2 at 70 and formed with a vertical handle portion 71 guided in slot 72 formed in the member 2, lies across the top of the lock bar 68 between pins 73. Springs 74 normally retain the rod 69 and the lock bar 68 in intermediate position, thereby locking the arms 64 and 65 in the bearings 67, see Fig. 6. By moving the handle 71 to one side, as indicated in Fig. 5 in dotted lines, the lock bar 68 is moved out of engagement with the arm 64, at which time the arm 64 may be swung over. By moving the handle 71 and lock bar 68 in the opposite direction, arm 65 is released and swung forward.

The moldboards and shares of the plows are reversed by means of the mechanisms secured on the draw bars 26 and 27 and plow frames 30 and 31. Rods 75, revolvably secured in bearings 76, on the draw bars 26 and 27, and in bearings 77 and 78 on the frames 30 and 31, are secured by means of universal joints 79 to crank rods 80, which are revolvably mounted in bearing forks 81 on the clevises 28 and 29. The rods 75, (see Fig. 8), are formed at their rearward ends with crank arms 82, which are connected to the moldboards 35 by link rods 83. The shares 36 are pivotally connected to the frogs 31 and 32, in the usual manner. The arms 82 are normally retained in notches 84, formed in brackets 85, which are secured on the frames 30 and 31 by action of springs 86 and collars 87 on the rods 75. A slight pull on the cranks 80 will release the arms 82 from the brackets 85, then by swinging over the cranks 80, the plows may be swung under the frogs and reversed, as indicated by dotted arrows in Fig. 8.

As the plow frame, when it is being normally operated, is in an inclined or tipped position, as indicated in Fig. 7, due to having one wheel 4 on unplowed ground and one wheel in a plowed furrow, it is necessary, in order to cut furrows of equal depth with both plows, to have the rear plow set lower than the front plow, relative to the horizontal axis of the wheels 4. The draw bars 26 and 27 are offset downwardly at 88 and 89, and are slidably supported and guided in bearing blocks 90, (see Fig. 13), which are in turn slidably secured in slots 91 formed in the columns 21 of the cross frame 1. U-shaped brackets 92, secured on the portion 23 of the cross frame 1, normally retain the slidable blocks 90 and the draw bars 26 and 27 within the slots 91. The blocks 90 are made of relatively softer material than the draw bars, and may be easily replaced after wearing by removing the U-shaped brackets 92, raising the draw bars out of the slots of the blocks 90, then sliding out the blocks 90 and replacing them with new ones. The offsets 88 and 89 in the draw bars 26 and 27 are so located as to bring the downwardly extending offset portion 26′, or 27′, as the case may be, within the bearing block 90 when the swivel arm 64 or 65 is in a forward position, as indicated in Fig. 12. When the arm 64 or 65 is in a rear position, the upper part of the bar 26 or 27 rests in the block 90. Thus, the rear plow, whichever it may be, is always hung below the front plow, as indicated in Figs. 1 and 7. Adjustment of the plows for various depths of furrow is accomplished with adjusting screws 93, (see Figs. 10 and 12) by means of which the blocks 90 are raised, or lowered, in the slots 91. The columns 21 are marked at 94 to indicate the depths of the furrow.

Because the plow frame is tipped in opposite directions when plowing in opposite directions, it is necessary to provide means for hanging the plows at an angle to the vertical axis of the plow frame and to also provide means for reversing this angle, in order to maintain the frogs of the plows in a vertical plane. This construction is most clearly seen in Figs. 7 and 8. Cams 95, fixedly secured on the rods 75, impinge against inner surfaces 96 of forks 97, formed on the plow frogs 32. The cams 95 are eccentrically secured on the rods 75 and thus maintain the frogs 32 at an angle to the frames 30 and 31. As the rods 75 are revolved to reverse the plows, the cams 95 are revolved, moving the forks 97 relative to the frames 30 and 31, and thus swinging the frogs 32 on the hinges 33 and reversing the angle between the frogs 32 and the vertical axis of the plow frame.

Figs. 2 and 3 illustrate means for attaching the plow frame to a tractor, or other draft device. A draw shaft 100 is slidably secured in a bracket member 101 on the under side of the tongue member 2. A plurality of openings 102, in the shaft 100, provide means for adjustment to the plow frame relative to the tractor, and the shaft 100 is locked in the bracket 101 by a pin 103, inserted in a lug 104 of the bracket 101 and through one of the openings 102. The forward end of the shaft 100 is secured, by means of a fitting 105, to a yoke 106, to which in turn, is secured a universal joint member 107. An opposing member 108 of the universal joint is fitted with a removable stud, or pin 109, for insertion in a drawbar 110 of a tractor. Thus, I have provided connected means, which are flexible in both horizontal and vertical planes, and also adjustable relative to the space between the plow frame and the draft device utilized to pull the plow frame.

The springs 42′ serve to return the bars 41 and pedal 39 to their normal positions, as shown in Figs. 1, 4, 9, and 12.

What I claim is:—

1. In combination, in a sulky plow, a wheeled frame member, a tongue member connected thereto, link members pivotally secured to said tongue member, a plurality of plow frames supported by the wheeled frame, slidable drawbars secured to the plow frames for moving one plow frame relative to the other for reversing their longitudinal positions at the end of a furrow, said drawbars being also pivotally secured to said link members, means for independently sliding the drawbars one at a time, means for retaining the drawbars in their adjusted positions.

2. In combination, in a sulky plow, a wheeled frame member, a tongue member connected thereto, a plurality of plow frames supported by the wheeled frame, slidable drawbars secured to the plow frames for moving one plow frame relative to the other for reversing their longitudinal positions at the end of a furrow, means for independently sliding the drawbars one at a time, locking means for retaining the drawbars in their adjusted positions,—reversible plowshares pivotally mounted on the plow frames, means for retaining the plowshares in their reversed positions and means for adjustably supporting the drawbars on the wheeled frame member, and means for bringing the plowshares into the same horizontal plane for plowing when the wheeled frame is in an inclined position.

3. In combination, in a sulky plow, having a wheel supported frame, a pair of drawbars slidably mounted on the said frame, link members pivotally secured to said drawbars and to said frame, plow frames secured to the drawbars, frog members, carrying plowshares, pivotally connected to the plow frames, and link members providing means for sliding the drawbars relative to each other for reversing their longitudinal positions at the end of a furrow, and means for locking the link members in their adjusted positions, said means comprising a slidable lock plate located over the link members, and means for maintaining the lock plate in its locking position.

4. In combination, in a sulky plow, having a wheeled frame, slidable drawbars, plow frames secured to the drawbars, crank arms pivotally secured on said frame and engaging the under surface of said drawbars, gears secured to the drive wheels, idler gears on the said frame operatively engaged by the gears secured to the drive wheels, gears on the wheeled frame normally out of mesh with the idler gears, operative connecting means between the said crank arms and the last mentioned gears, a foot pedal, connecting means between the foot pedal and the last mentioned gears for moving the same into mesh with the idlers for elevating the drawbars when the sulky plow is drawn forward, as described, and means for disengaging the gears on the frame and the idler gears when the drawbars have reached their elevated positions.

5. In combination, in a sulky plow, slidable drawbar members having bent or offset portions, plow frames secured to the drawbars, plowshares secured to the plow frames, means on the drawbars for rotating the plowshares to bring them into the same horizontal planes for the return movement of the plow, means for retaining the plowshares in their rotated positions, bearings for the offset portions of the drawbars, whereby when the bars are moved longitudinally the offset portions will effect a raising or lowering of the plow frames and shares, and means for longitudinally sliding or moving the drawbars.

6. In a sulky plow a plurality of plow frames, a tongue member, means for longitudinally sliding one plow frame relative to the other comprising drawbars on which the plow frames are secured, a clevis on each drawbar, a link pivoted to the tongue member and to each clevis for movement through substantially a semicircle for sliding the drawbars, means for retaining the drawbars in their adjusted positions comprising a slidable plate located over the links.

7. In combination, in a reversible sulky plow, a pair of drawbars, a tongue member to which the drawbars are connected, plowshares pivotally secured to the drawbars, rotatable and slidable members on the drawbars connected to the plowshares for rotating the plowshares at the end of a furrow for the return trip, means for automatically locking the plowshares after rotation, and means for releasing the locking means when the said members are moved axially of the drawbars.

8. A sulky plow having in combination, a pair of slidable drawbars, plow frames and plowshares on the said bars, the bars having vertically offset portions, bearing blocks in which the offset portions of said bars are located for permitting the bars and plow frames to alternately assume a lower or raised position relative to each other and to the plow frame when reciprocated in the said blocks.

9. In combination, in a sulky plow a wheeled frame formed with vertical slots, bearing blocks slidably located in the slots, means for adjusting said blocks, drawbars located in the bearing blocks and formed with offset portions, plow frames and plowshares secured to the drawbars, means for reciprocating the drawbars in the said blocks for alternately raising and lowering the plow frames and shares when the offset portions engage and disengage in the said blocks.

10. A sulky plow having in combination, a wheeled frame, slotted members forming a part of said frame, drawbars slidably mounted in the slotted members, plow shares pivotally secured to the drawbars, means on the drawbars for rotating the plowshares, and means for releasably retaining the plowshares in their rotated positions.

11. In combination, in a reversible plow construction, a frame, bearing blocks adjustably supported in said frame, drawbars slidably secured in said blocks, plow frogs hingedly secured to said drawbars, plowshares and moldboards pivotally secured on said frogs, rods revolvably secured on said drawbars, operative connecting means between said rods and said plowshares and moldboards for reversing the plowshares and moldboards when the rods are revolved, and means for reversing the angle of the plow frogs relative to the axis of the frame for maintaining the plow frogs in a vertical plane when the frame is tipped sidewise in either direction, said means comprising fork members rigidly secured on said frog members and cam members eccentrically secured on said rods and engaging said fork members, whereby the fork members and frogs are tipped at an angle with the frame and this angle is reversed when the rods are revolved.

12. In combination, in a reversible plow construction, a wheeled frame, a tongue member secured to said frame, a plurality of drawbars slidably secured in said frame, a plow secured to the rear portion of each drawbar, link members pivotally secured to the forward end of the drawbars and to the tongue member, a lock bar slidably secured in said tongue member and normally locking said link members in operative position, means for moving said lock bar to permit movement of the link members comprising an operating lever pivotally secured in said tongue member, spring means for normally maintaining the operating lever in neutral or locking position, pins secured in said lock bar impinging against said operating lever on either side, whereby when the operating lever is moved to one side, the drawbar is withdrawn out of engagement with a link member to permit pivotal movement of the link member and longitudinal movement of the drawbar connected thereto.

13. In combination in a reversible plow construction, a wheel supported frame having a tongue member, a plurality of link members pivotally secured to said tongue member, drawbars pivotally secured to said link members, plows reversibly secured on said drawbars, means for maintaining said drawbars in a horizontal operative position longitudinally, a draw shaft, means for adjustably securing said draw shaft to said tongue member, a yoke member secured to said draw shaft, a universal joint on said yoke member, and means for removably securing the drawbar of a draft device or harness to said universal joint.

14. In combination, in a plow construction, a frame, wheels revolvably secured to said frame, drawbar members supported on said frame, plow frames secured to said drawbar members, crank arms movably supported on said frame, operative connecting means between said crank arms and said drawbar members, hand levers connected to said crank arms for raising and lowering the drawbar members and the plow frames, operative connecting means between said crank arms and said wheels, and means for engaging and disengaging said last named operative connecting means, substantially, as described.

15. In combination, in a sulky plow, a wheeled frame, a plurality of plow frames supported on the wheeled frame, a slidable drawbar on said frame connected to each plow frame, means for independently sliding each drawbar relative to the other, means operated from the wheels of the wheeled frame for elevating both plow frames at the same time, means for automatically locking or retaining the plow frames in their elevated positions, and means for automatically disconnecting the said elevating means operated from the wheels of the wheeled frame when the plow frames have been elevated and retained in their elevated positions.

16. In combination, in a sulky plow, a wheeled frame, a plurality of plow frames supported on the wheeled frame, a slidable drawbar on said frame connected to each plow frame, means for independently sliding each drawbar relative to the other, means operated from the wheels of the wheeled frame for elevating both plow frames at the same time, means for automatically locking or retaining the plow frames in their elevated positions, and means for automatically disconnecting the said elevating means operated from the wheels of the wheeled frame when the plow frames have been elevated and retained in their elevated positions, said means comprising a gear driven by the said wheels, an idler gear meshing with said gear, a third gear normally out of engagement with the idler gear, a foot pedal, connecting means between the foot pedal and the third gear for moving the third gear into mesh with the idler gear, and means actuated by the third gear for elevating the drawbars and plow frames connected thereto, and tripping means for rendering the third gear inoperative after the plow frames have been elevated, as described.

17. In combination, in a reversible plow construction, a wheeled frame, bearing blocks adjustably supported in said frame, drawbars slidably secured in said blocks, plow frogs hingedly secured to said drawbars, plowshares and moldboards pivotally secured on said frogs, rods revolvably secured on said drawbars, operative connecting means between said rods and said plowshares and moldboards for reversing the plowshares and moldboards when the rods are revolved, and means for reversing the angle of the plow frogs relative to the axis of the wheels for maintaining the plow frogs in a vertical plane.

ROBERT B. CLAGHORN.